United States Patent Office 3,553,185
Patented Jan. 5, 1971

3,553,185
PROCESS FOR PRODUCING POLYVINYLIDENE
FLUORIDES HAVING HIGH HEAT STABILITY
Yasuo Amagi and Nobuo Bannai, Iwaki-shi, Japan, assignors to Kureha Kagaku Kogyo Kabushiki Kaisha, Tokyo-to, Japan
No Drawing. Continuation-in-part of application Ser. No. 595,018, Nov. 17, 1966. This application Nov. 3, 1969, Ser. No. 873,487
Claims priority, application Japan, Dec. 10, 1965, 40/75,942
Int. Cl. C08f 1/11, 1/80, 3/22
U.S. Cl. 260—92.1                                                 2 Claims

ABSTRACT OF THE DISCLOSURE

Polyvinylidene fluorides of excellent heat stability and desirable intrinsic viscosity are obtained by suspension or precipitation polymerization using a dialkylperoxidicarbonate as the polymerization catalyst.

REFERENCE TO RELATED APPLICATION

This application is a continuation-in-part of our copending application Ser. No. 595,018 filed Nov. 17, 1966, now abandoned for "Process for Producing Polyvinylidene Fluorides Having High Heat Stability."

BACKGROUND OF THE INVENTION

This invention relates to techniques in the production of polyvinylidene fluorides, and more particularly to a new process for producing polyvinylidene fluorides having excellent heat stability and desirable intrinsic viscosities through the use of suitable polymerization catalysts.

As the known processes for polymerizing vinylidene fluoride, there has been proposed in U.S. Patent No. 2,435,537 (Ford et al.) that the polymerization of vinylidene fluoride is carried out under a high pressure of more than 300 kg./cm.$^2$ with organic or inorganic peroxides such as ammonium persulphate, peroxy-benzoyl, etc. as the polymerization catalyst. In one actual example of this patent, the polymerization conducted under a pressure of 1,000 kg./cm.$^2$ and above is shown, which is considered disadvantageous and the polymerization under a lower pressure is preferable. Also, in U.S. Patent 3,195,-539, there is taught that an emulsion polymerization is carried out of a temperature in the neighborhood of 120 degrees C. with di-tert-butyl peroxide as the catalyst, however, as the vinylidene fluoride monomer is apt to cause stoppage of polymerization with various kinds of organic substances and no polymer can be obtained at all with ordinary emulsifiers, it is necessary to use fluoride-containing surface activating agent as the emulsifier. Furthermore, with the use of such emulsifier, stability of the emulsion becomes deteriorated when the resin concentration during the emulsion-polymerization exceeds 15%, wherefore the productivity of the polymer is low.

On account of such various disadvantages inherent in the prior arts as mentioned in the foregoing, the most ideal method of polymerizing vinylidene fluoride is considered to be the so-called suspension polymerization, wherein vinylidene fluoride monomer is polymerized by being suspended in water by the use of a suspending agent such as polyvinyl alcohol, methyl cellulose, etc. However, as polyvinylidene fluoride monomer is a compound having its critical temperature of 30.1° C. and critical pressure of 45 kg./cm.$^2$, it is necessary that suspension polymerization of the monomer be carried out with a catalyst capable of causing polymerization below the abovementioned critical temperature and pressure.

With a view to finding out whether the catalysts as taught in the above stated prior art patents meet the requirement of the suspension polymerization of vinylidene fluoride monomer, experiments were conducted with the calyst and the following conclusion has been reached.

Ammonium persulphate and other inorganic peroxide catalysts as taught in U.S. Patent No. 2,435,537 is found to be capable of causing the suspension-polymerization of vinylidene fluoride monomer below the critical temperature, but no polymer could be produced with an organic peroxide, and, even under the pressure of 100 atmospheres and at a higher temperature of 100° C., only a polymer having poor film forming capability was recognized to have produced in extremely small quantity. Further, the polyvinylidene fluoride produced by the use of ammonium persulphate and othetr inorganic peroxide catalysts possesses the film forming capability but poor in its heat stability, i.e., when the polymer is heated to melt at the forming temperature thereof, it changes color to yellow or blackish brown, which is not at all suitable for practical use.

The facts that polyvinylidene fluoride obtained by the use of an inorganic peroxide catalyst is poor in the heat stability and that vinylidene fluoride monomer indicates extreme difficulty in its polymerization with organic peroxide catalyst such as benzoyl peroxide, etc. are already pointed out by the inventors of U.S. Pat. No. 3,193,539.

The deterioration in the heat stability of polyvinylidene fluoride obtained by the use of the inorganic peroxide catalysts are considered to be due to residual metallic ions in the catalyst which badly affect the heat stability. It is therefore necessary to find out a more active catalyst for generating organic radical and capable of causing polymerization of vinylidene fluoride at a low temperature and under a low pressure. However, as has already been mentioned in the foregoing, vinylidene fluoride radical possesses very strong hydrogen pulling action due to C-H radical existing in many of the organic radical generating catalysts which easily causes stoppage in radical reaction. On account of this, even if an active catalyst for generating organic radicals is selected, it is not sufficient to produce polyvinylidene fluoride.

As a result of extensive research, on the polymerization of vinylidene fluoride, we have discovered that it is possible to use dialkylperoxydicarbonates having from 1 to 5 carbon atoms of the alkyl group as catalysts and that, with the use of these catalysts, it is possible to accomplish polymerization at a low temperature of from 0 to 50 degrees C. Particularly at a temperature below the critical temperature (30.1° C.) of vinylidene fluoride, we have been able to produce, with high efficiency by suspension polymerization, a polyvinylidene fluoride powder of pearly state of a particle diameter of approximately 200 microns.

This polyvinylidene fluoride produced by suspension polymerization has a melting point which is from 10 to 15 degrees C. higher than the melting points of polyvinylidene fluorides heretofore produced industrially (from 169 to 171 degrees C.) and, moreover, has high heat resistance, excellent workability when the degree of polymerization is appropriately regulated, and high strength and impact resistance. However, since chlorinated hydrocarbons such as chloroform was used as regulators of the degree of polymerization in the initial polymerization which we carried out, the resulting polymers were deficient in heat stability and had disadvantageous features such as a tendency to decompose during processes such as melt extrusion.

From analyses of gases of heat decomposition, we have discovered that this deficiency in heat stability is caused primarily by the introduction of chlorine contained in the regulator of the degree of polymerization into the polymer. As a result of our efforts to find a regulator of the degree of polymerization in place of chlorinated hydrocarbons, we have succeeded in producing polyvinylidene fluorides having excellent heat stability.

According to the present invention, there is provided a process for producing polyvinylidene fluorides having high heat stability which is characterized by carrying out suspension polymerization of vinylidene fluoride at a temperature of from 0 to 30 degrees C. in water containing 0.5 to 20% by weight of acetone with the use of at least one catalyst selected from among lower dialkylperoxydicarbonates representable by the following general formula

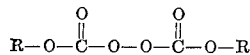

(where R is $CH_3$, $C_2H_5$, $n\text{-}C_3H_8$, $i\text{-}C_3H_8$, or $sec\text{-}C_4H_{10}$).

Polyvinylidene fluorides produced according to the invention exhibit no discolouration whatsoever when heated, for example, at 250 degrees C. for more than 10 minutes and do not undergo any change such as decomposition or discolouration when subjected to continuous extrusion for more than 8 hours at a temperature of from 220 to 250 degrees C.

We have found that the quantity of catalyst to be used in the process according to the invention should be in the range of from 0.1 to 3 percent by weight relative to the vinylidene fluoride monomer. If the quantity of the catalyst is excessively small, the rate of polymerization will be slow, and, at the same time, the polymerization yield will be poor. On the other hand, if this quantity is excessively large, the catalyst itself will function as a polymerization regulator, and not only will it become impossible to obtain a high polymer, but the heat stability of the polyvinylidene fluoride thus obtained will be generally impaired. Preferable quantity of the catalyst to be used ranges from 0.5 to 1.5% by weight with respect to vinylidene fluoride monomer.

As a criterion of the degree of polymerization, the intrinsic viscosity $\eta_{inh}$ of the material may be used. The intrinsic viscosity $\eta_{inh}$ of a polyvinylidene fluoride can be expressed as $\eta_{inh}=ln\eta_{r/c}$, where $\eta_r$ is the ratio of the viscosity at 30 degrees C. of a 0.4 gramme/100 cc. solution of the polyvinylidene fluoride in dimethyl formamide to the viscosity of the solvent, and $c$ is the concentration of the solution.

According to the present invention, it is possible to adjust the intrinsic viscosity $\eta_{inh}$ of a polyvinylidene fluoride at any value from 0.4 to 1.7. Furthermore, in the case where the acetone/$H_2O$ ratio is selected to be 20/80, a polymer suitable for fluid lining of a mean particle diameter from 50 to 60 microns (which can be rendered further into a polymer of finer particle size depending on the agitation conditions) with a value of the intrinsic viscosity $\eta_{inh}$ of from 0.6 to 0.7.

For a polymer for extrusion, however, an intrinsic viscosity $\eta_{inh}$ of from 0.8 to 1.0 is desirable. As one process for producing such a polymer at the lowest cost in the case, for example, wherein di-n-propylperoxydicarbonate is used, an acetone/$H_2O$ ratio in the range of (1 to 4)/(99 to 96) is used, and suspension polymerization is carried out at 25 degrees C., whereby, with a polymerization time of approximately 20 hours, a polymer in the form of spherical particles of a particle diameter of approximately 150 microns are obtained with a high yield of 90 percent or more.

A polymer produced in this manner has very high heat stability and exhibits excellent workability in working processes such as melt spinning and injection moulding.

When the quantity of acetone is reduced further, a polymer of an intrinsic viscosity $\eta_{inh}$ of 1.0 or higher is obtained. When the value of $\eta_{inh}$ exceeds 1.2, the fluid viscosity of the polyvinylidene fluoride becomes high, and melt forming becomes progressively difficult. A resin of this character, however, can be used for processes such as compression moulding.

The preferable range of the polymerization temperature in the case of suspension polymerization is mainly from 0 to 30 degrees C. However, it is possible to carry out the polymerization at a temperature above the critical temperature of the vinylidene fluoride at the last stage of polymerization so as to complete it earlier.

In U.S. Pat. No. 2,435,537, it is also described that acetone possesses extremely slight polymerization regulating function. However, the function of regulating the degree of polymerization is largely governed by the catalyst used, the reaction conditions, etc. Particularly, in the present invention where an oil-soluble organic radical catalyst is used for suspension polymerization, as the vinylidene fluoride monomer which is insoluble with water is subjected to polymerization in a non-uniform polymerization system dispersed in water, in which a catalyst is dissolved, the polymerization regulator existing in small quantity is considered to influence less on the degree of polymerization, and, moreover, acetone used in the present invention, according to the U.S. patent, possessess extremely small degree of regulating function of the degree of polymerization. In spite of this, when it is used together with dialkylperoxydicarbonate, it becomes capable of regulating appropriately the degree of polymerization of vinylidene fluoride, which is surprising.

Thus, the present invention provides a highly advantageous process for producing easily, rapidly, and economically polyvinylidene fluorides having excellent heat stability and workability. In order to indicate still more fully the nature and utility of the invention, the following examples of typical procedure and results are set forth, it being understood that these examples are presented as illustrative only, and that they are not intended to limit the scope of the invention.

EXAMPLE 1

3,600 grammes (g.) of deoxygenated and deionized water, 72 g. of acetone, 3.6 g. of methylcellulose, 12 g. of di-n-propylperoxydicarbonate, and 2.4 g. of $Na_4P_2O_7$ were placed in a 6-litre stainless-steel autoclave. The autoclave was then cooled with methanol Dry Ice to a temperature below 0 degree C. and then evacuated.

Next, the cylinder of vinylidene fluoride was communicated with the autoclave by a length of copper tubing and slightly heated to cause 1,200 g. of the monomer to vapourise and, through a condensation process, to be transferred to the autoclave. Then, as the contents of the autoclave were agitated at a rotational speed of from 300 to 500 r.p.m., the temperature thereof was raised to 25 degrees C., at which temperature the contents were caused to react for 25 hours, during which the polymerization pressure decreased from 40 kg./cm.$^2$ to below 15 kg./cm.$^2$. Since, at still lower pressures, the rate of pressure drop becomes low, the polymerization reaction was stopped. As a result, particles of a polymer of a particle diameter of 150 microns was obtained with a yield of 91 percent.

This polymer, upon being filtered, washed with water, and then dried at about 100 degrees C. for 24 hours, had an intrinsic viscosity ($\eta_{inh}$) of 0.92, a melting point of 181 degrees C., and a crystallization temperature of 145 degrees C. The heat stability of this polymer was indicated extremely high by the complete absence of colouration in products formed by injection moulding and melt spinning this polymer at a temperature in the neighbourhood of 250 degrees C.

As a further test, 1 or 2 grammes of this polymer was placed on a piece of aluminium foil and hot pressed at a temperature of 250 degrees C. and under a pressure of 30 kg./cm.$^2$ for 10 minutes, but no colouration whatsoever was observable. (For comparison, when $CHCl_3$ was used as a polymerization regulator, and the resulting polymer was tested under these same conditions, the polymer assumed a dark brown colour.)

EXAMPLE 2

The same autoclave used in Example 1 was charged with 3,200 grammes (g.) of deoxygenated and deionized water, 400 g. of acetone, 6.4 g. of methylcellulose, 2.4 g. of $Na_4P_2O_7$, and 12 g. of diisopropylperoxydicarbonate as a polymerization initiator and then charged in the same manner as set forth in Example 1 with 1,200 g. of vinylidene fluoride monomer. The polymerization process was then carried out under the same conditions as set forth in Example 1, whereupon, with a polymerization time of 42 hours, the polymerization pressure decreased from 38 kg./cm.² to 19 kg./cm.². When the polymerization was stopped at this point, fine particles of the polymer of a mean particle diameter of 50 microns and intrinsic viscosity $\eta_{inh}$ of 0.61 were obtained with a polymerization yield of 90.5 percent.

The polymer thus obtained was filtered and washed with water and was then dried at a temperature of from 90 to 100 degrees C. for 24 hours. The resulting polymer had an apparent density of 39 grammes/decilitre, a melting point of 180 degrees C., and a crystallization temperature of from 145 to 146 degrees C. and exhibited a heat stability equivalent to that of the polymer produced according to Example 1. This polymer was found to be particularly suitable for use as a fluid lining.

What we claim is:

1. A process for producing polyvinylidene fluoride having high heat stability which comprises carrying out suspension polymerization of vinylidene fluoride monomer at a temperature of from 0° C. to 30° C. in water containing 0.5 to 20% by weight of acetone with the use of from 0.1 to 3% by weight with respect to said monomer of at least one kind of dialkylperoxydicarbonates respectively having alkyl radical selected from group consisting of methyl, ethyl, n-propyl, iso-propyl, and sec-butyl.

2. Process according to claim 1, in which the polymerization is regulated to produce a polyvinylidene fluoride having an intrinsic viscosity of $\eta_{inh}$ of from 0.4 to 1.7.

References Cited
UNITED STATES PATENTS

| | | | |
|---|---|---|---|
| 2,435,537 | 2/1948 | Ford et al. | 260—92.1 |
| 2,464,062 | 3/1949 | Strain | 260—92.1 |

JOSEPH L. SCHOFER, Primary Examiner

J. A. DONAHUE, JR., Assistant Examiner